Figure 1:
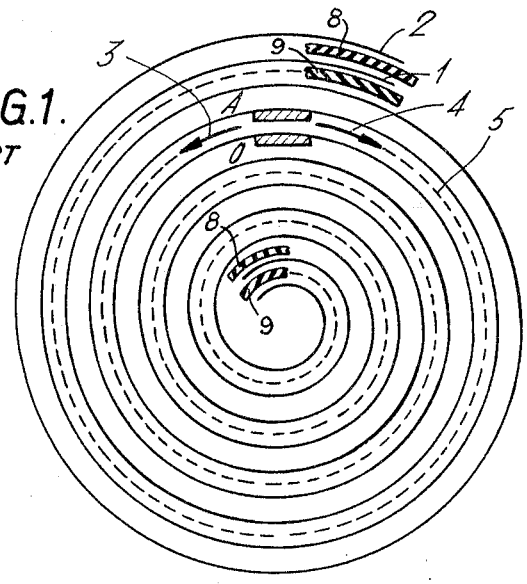

United States Patent Office 3,239,732
Patented Mar. 8, 1966

3,239,732
ELECTRICAL CAPACITORS
Richard Anthony Fitch, Mortimer, and Vernon Thomas Seymour Howell, Newbury, England, assignors to United Kingdom Atomic Energy Authority, London, England
Filed May 14, 1962, Ser. No. 195,048
Claims priority, application Great Britain, May 18, 1961, 18,139/61
3 Claims. (Cl. 317—260)

This invention relates to electrical capacitors of the type having tab member connections extending into the capacitor for carrying discharge current from conductor foils.

An object of the invention is to minimise tearing or burning inside the capacitor at points where the edges of the tab member connections are in contact with the conductor foils.

It has been observed that large capacitors having low inductances have a most undesirable tendency to breakdown through internal tearing or burning, this being especially apparent when the capacitor is repeatedly discharged in a very low inductance circuit. For example serious trouble occurred with a rolled foil capacitor 10μf., 10 kv. discharging into a circuit of total inductance about 10 nh. The use of production of reliable large low-inductance capacitors has thus been precluded.

The use of a single large capacitor in place of a number of small capacitors is desirable from an electrical point of view since it enables the discharge circuits to be completed with a smaller number of capacitor connections. Furthermore, considering rolled foil capacitors, there are economic advantages in producing a single large capacitor, the cost per unit capacitance can be lower for larger capacitors.

The invention is especially useful with respect to rolled foil capacitors but it can also be used with capacitors of the stacked type.

The discharge of a capacitor through a load is a complex operation. While it is not necessary to discuss the operation in detail, it is desirable to mention at this point some of the more important features. The stored charge can be considered to be an electrostatic vectorial quantity which is converted to an electromagnetic vectorial quantity by a discharge wave travelling along the insulator from the tab connections. The conductor foils and the tab connections are subjected to an impulsive force as the wave front advances, this impulsive force being parallel to the wave front.

The impulsive force applies itself equally to the tab member connections and to the conductor foil but its effect on each is different. The tab member connections are thicker than the conductor, the dimensions being governed by considerations of mechanical strength and also by the necessity for the tab member connection to carry the discharge current. For example, the tab member connection for a 10 kv., 10μf. rolled-foil capacitor is normally a copper tab of thickness .005 inch. The thickness of the conductor foil is normally not more than .001 inch for such a capacitor. The mass of any small unit area of the tab member connection is therefore higher than that of the same area of conductor foil. The difference in density of the materials will accentuate this.

Under the influence of the impulsive force a free unit area of the conductor foil would acquire an acceleration greater than that of a free unit area of the tab member connection. The conductor foil in the capacitors of the prior art therefore tends either to tear against the edge of the tab member connection or to move momentarily away. In either case local arcing and burning can result. For example it has been observed that the rolled-foil capacitor of 10 μf. capacitance and 10 kv. working voltage, the inductance of the discharge circuit being 10 nh. showed serious burning at the edges of the tab connections after only a few discharges whereas a capacitor of only 1 μf. and similar inductance did so only after some hundreds of discharges at a similar voltage.

In this invention, on the other hand, the edge of the tab member connection can move in sympathy with the conductor foil, thereby preventing tearing or arcing. In the invention, a tab member area or thick spine portion bounded on one side by the edge, is given a thickness such as to enable the edge to move with the same amplitude as the conductor foil with which it is in contact. The thickness for best results will depend on the magnitude of the forces involved. A 1:1 ratio thickness has been found satisfactory in the above mentioned capacitor but the thickness ideally should be zero to avoid all possibility of mass discontinuity at the edge. The ideal situation cannot be realised in practice, but simple experiment can give a good guide as to the best compromise.

The invention therefore consists in an electrical capacitor comprising conductor and insulator foils and tab member connections to the conductor foils for carrying discharge current the said tab member connections extending into the capacitor, each tab member connection having an area bounded on one side by an edge of the tab member, said edge being in contact with a conductor foil, the mass of the said area being sufficiently small in relation to the mass of the same area of conductor foil, and the size of the said area being sufficient, to enable the said edge to move with the conductor foil under an applied impulsive force rising during discharge of the said capacitor so that burning or tearing of the conductor foil during discharge is substantially prevented.

In one form of the invention, the said area is provided by a thin conductive foil, or a plurality of foils forming a stepped configuration, positioned between a tab connection and the conductor foil, the combination of tab connection and the said conductive foil forming a tab member connection.

It is believed, that the invention may be considered to reside in the avoidance of major discontinuities in the ratio of the total mass of conductor foil and tab connector to the mass of conductor foil at the edges of the tab member connection or elsewhere.

Figure 2:
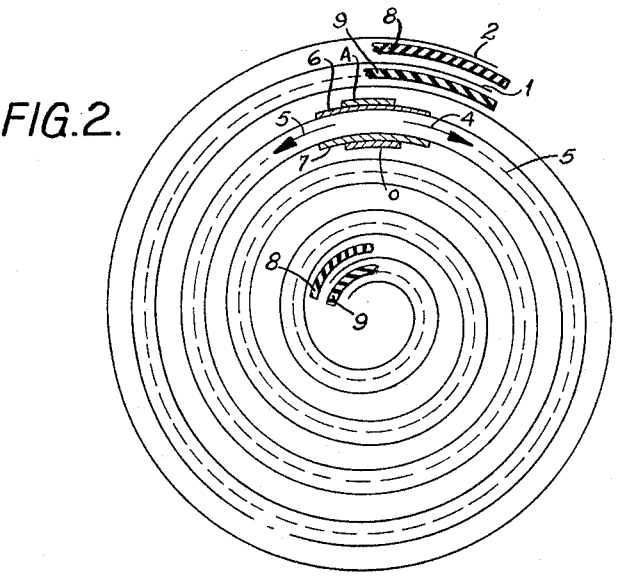

While not wishing to be bound by any theory, the inventors believe that the invention will be better understood by reference to the following discussion and drawings which accompanied the Provisional Specification in which, FIGURE 1 is a diagrammatic axial view of a rolled foil capacitor embodying the invention, FIGURE 2 is a similar view of a capacitor embodying the invention.

In FIGURE 1 a rolled foil capacitor is composed of conductors 1 and 2 separated by insulator foils shown partially at 8 and 9. A tab connection A is in electrical contact with conductor foil 1 and a tab connection O is in electrical contact with conductor foil 2.

In FIGURE 2 a metal foil 6 of thickness less than the thickness of the tab A is positioned between tab connection A and conductor 1 and a similar foil 7 is positioned between the tab connection O and conductor 2 the combination of foil and tab connection forming a tab member connection.

Let us consider FIGURE 1. If a discharge is initiated by closing a low inductance switch across tabs AO, two waves originate at the tabs and travel along the transmission lines in opposite directions indicated by arrows 3 and 4. The path of the waves is shown by the dotted line 5. It can be seen that the waves travel along only half the insulator and as a result only half the capacitor is discharged during the time taken for the waves to reach the inner and outer ends of the roll. The capacitor can be regarded as two separate transmission lines, only one of which is discharged by the connection of tabs A and O.

It is clear that there will be a magnetic pressure difference between the two transmission lines.

The magnetic pressure differences causes a sudden outward movement of the conductor foils. Since the conductor foils in a rolled foil capacitor are thin and have low mass and the masses of the tabs are relatively high, impulsive shearing forces are set up and the foils are torn by the edges of the tabs. As can be seen in FIGURE 1 there would be shearing forces at the edges of the tabs A and O.

A change in configuration so that the tabs A and O were separated solely by one thickness of insulator foils would be of no assistance, for the magnetic pressure difference would force the conductor foils away from the tabs and cause localised arcing.

From the above discussion, the action of the invention can be appreciated. In FIGURE 2 the foils 6 and 7 have a low mass and inertia approximately the same as those of the conductors 1 and 2. A sudden movement of the conductors due to magnetic pressure difference will therefore cause the foils 6 and 7 to move and impulsive shearing forces will not occur.

The invention has been applied satisfactorily to the 10 kv., 10 μf. capacitor referred to earlier in the specification. In this example, the foils 1 and 2 are 0.001 inch thick and are 18 inches wide, the insulation between them being 0.005 inch thick impregnated paper. The tabs A and O are 0.005 inch thick, extend 18 inches into the capacitor to cover the full width of foils 1 and 2, and are 3 inches wide. Foils 6 and 7 are 0.001 inch thick, likewise extend across the full width of foils 1 and 2, and are 9 inches wide, thus extending 3 inches beyond each side of the tabs along the latter foils.

What we claim is:

1. An electrical capacitor comprising conductor and insulator foils and tab member connections to the conductor foils for carrying discharge, the tab member connections extending into the capacitor and held against the conductor foils by pressure, each tab member being of conductive material and having a thick spine portion and thin flexible wing portions extending sidewise from the entire length of the spine portion of the capacitor, the thickness of the wing portions being such that the extremities of the wing portions in contact with the conductor foils may move with the conductor foil under an applied impulsive force arising during discharge of the said capacitor so that burning or tearing of the conductor foil during discharge is substantially prevented.

2. An electrical capacitor as claimed in claim 1 in which the said wing portion is provided by a thin foil of conductive material located between a relatively thick tab connection and a conductor foil.

3. An electrical capacitor as claimed in claim 1 in which the said wing portion is provided by a plurality of thin foils of conductive material between a conductor foil and a tab member connection, having a stepped edge configuration from the conductor foil to the tab member connection.

References Cited by the Examiner

UNITED STATES PATENTS 2,172,604  9/1939  Blackburn _____ 317—261

FOREIGN PATENTS 848,440  9/1960  Great Britain.

JOHN F. BURNS, *Primary Examiner.*

JOHN P. WILDMAN, *Examiner.*